United States Patent [19]

Masuda et al.

[11] Patent Number: 6,078,330
[45] Date of Patent: *Jun. 20, 2000

[54] SOLID MODEL CONSTRUCTION METHOD AND APPARATUS

[75] Inventors: Hiroshi Masuda, Tokyo; Masayuki Numao, Kawasaki; Shuichi Shimizu, Yokohama, all of Japan

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/132,943

[22] Filed: Oct. 7, 1993

[30] Foreign Application Priority Data

Oct. 7, 1992 [JP] Japan ...................................... 4-268650

[51] Int. Cl.⁷ ............................. G06T 15/00; G06T 15/70
[52] U.S. Cl. ............................................ 345/420; 345/419
[58] Field of Search ........................... 395/119–126, 163, 395/162, 137, 118–120, 133; 345/419, 420, 426, 437, 433, 418, 421, 422, 423, 424, 425

[56] References Cited

U.S. PATENT DOCUMENTS 5,278,983   1/1994   Kawabe et al. ......................... 395/120

OTHER PUBLICATIONS

*Articial Intelligence, an International Journal*, vol. 28, No. 1 Feb. 1986, "An Assumption–based TMS", J. de Kleer, pp. 127–162.

*Advanced Geometric Modelling for Engineering Applications*, "A Mathematical Theory and Applications of Non–Manifold Geometric Modeling", H. Masuda et al, pp. 89–103.

"A General Labeling Algorithm for Assumption–Based Truth Maintenance", J. de Kleer, pp. 188–192.

Masuda et al., *Advanced Geometric Modeling for Engr. Apps.*, "A Theory and App for Non–Manifold Modeling.", (1990).

Sakurai, et al. *Solid Model Input Through Orthographic Views*, Computer Graphics, Jul. (1983,) vol. 17 No. 3.

Nagasamy, Reconstruction of 3D Objects Using a KB Environment, Rutgers University (1989).

Foley, Computer Graphics: Principles and Practice, Zed Addison–Wesley Pub Co (1990).

Goetsch, David L., *CADD Understanding Computer–Aided Design & Drafting*, PennWell Publishing Co., pp. 71–73, 1986.

*Primary Examiner*—Stephen S. Hong
*Assistant Examiner*—Alford W. Kindred
*Attorney, Agent, or Firm*—Mark S. Walker; David A. Mims

[57] ABSTRACT

To simplify the solid model selection work of the user. An image processing unit prepares a cell decomposition model from three orthographic view data, a link of individual cells C1, C2, C3, C4, . . . in the prepared cell decomposition model is detailed referring to lines E1, . . . represented on the three orthographic views, and a solid model is constructed according to a non-conflicting cell combination.

5 Claims, 8 Drawing Sheets

(TOP VIEW)

(FRONT VIEW)           (SIDE VIEW)

SOLID MODEL CONSTRUCTION METHOD AND APPARATUS

BACKGROUND OF THE INVENTION

1. Field of the Invention

This invention relates to a solid model construction method and an apparatus thereof in which the shape of a solid model is inputted as two-dimensional coordinate data in the form of two or three orthographic views for conversion to three-dimensional coordinate data showing a stereographic structure of a solid model.

2. Description of the Prior Art

Figure 8:
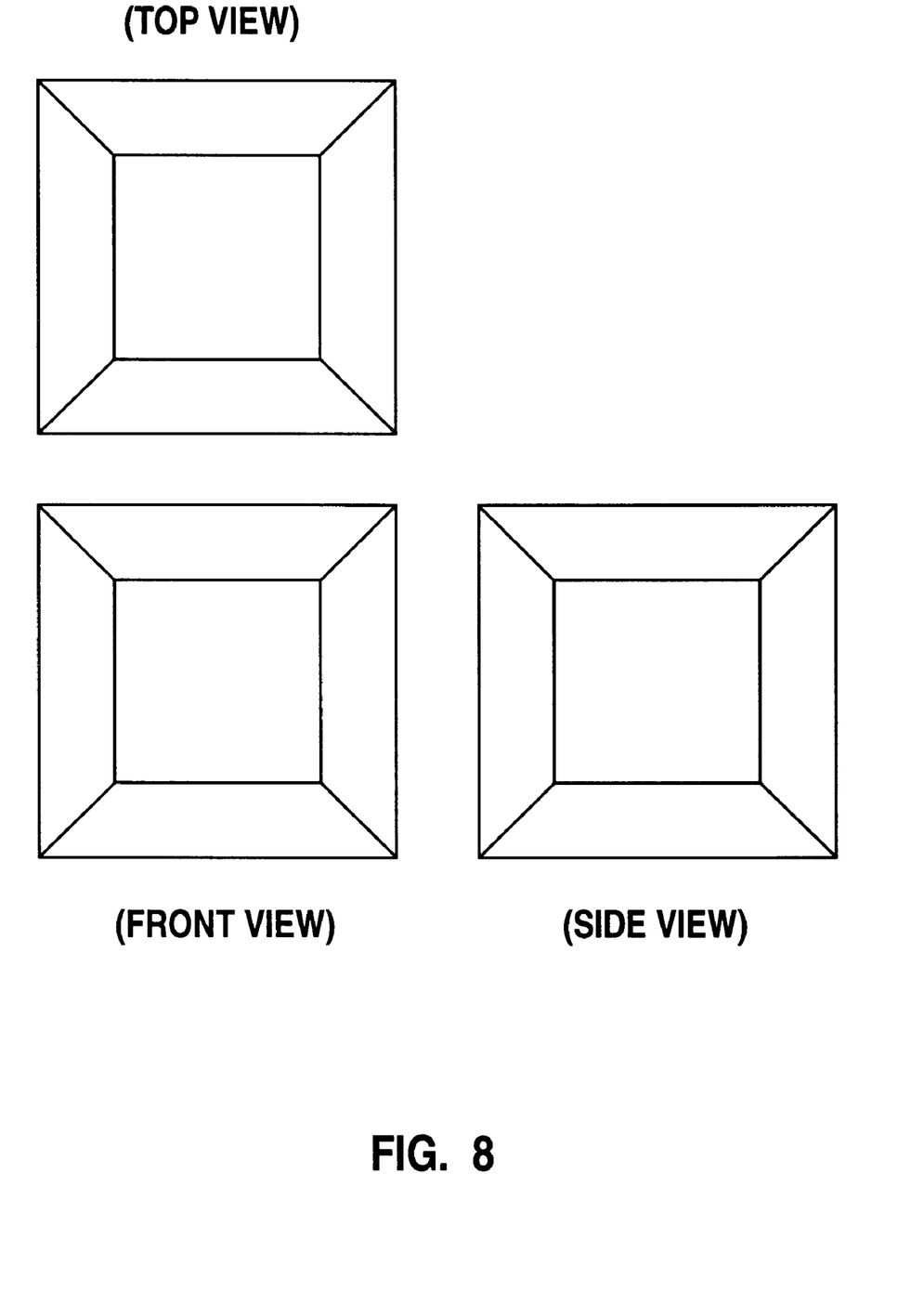
FIG. 8 is a schematic illustration explaining an example of orthographic views.
Figure 9A:
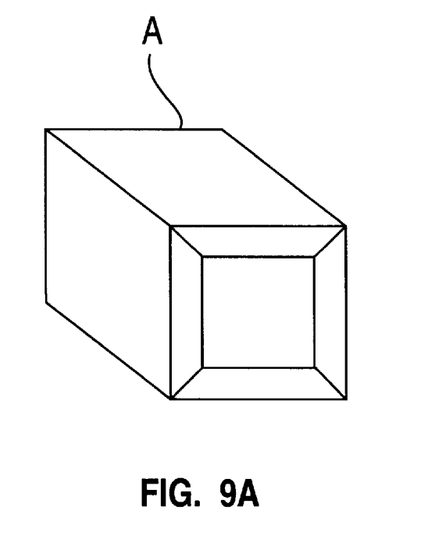
FIGS. 9A–9C are schematic perspective illustrations showing the shape of a solid model corresponding to the orthographic views in FIG. 8.
Figure 9B:
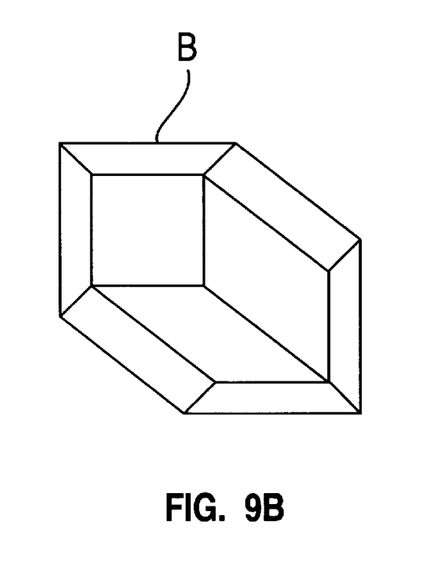
Figure 9C:
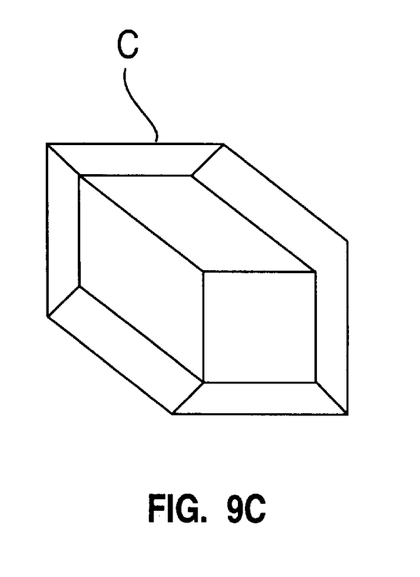

As proposed in Japanese Patent Laid-open Publication 62-202271 and the like, it is known to provide systems where structural data in the form of three orthographic views (e.g. as shown in FIG. 8) are converted to shape data in the solid model form (e.g. as shown in FIG. 9), and the shape of the solid model is displayed as is.

A typical prior art procedure for forming a solid model from the three orthographic views by an image processing unit is as follows.

(1) Construction of candidate vertices

From individual vertices on the three orthographic views, those which are possible to be vertices on a three-dimensional coordinate view are selected to construct three-dimensional candidate vertices.

(2) Construction of candidate edges

If a projection pattern of a definite line connecting given two candidate vertices appears as a vertex or a definite line in all of the given three orthographic views, and no other candidate vertex is present between the two candidate vertices, that line is held. as a candidate edge.

(3) Construction of candidate face

A face surrounded by candidate edges on a same plane and including no other candidate edge within is held as a candidate face.

(4) Construction of true surface model

Using knowledge of three-dimensional shapes, candidate vertices and candidate edges conflicting as elements of a solid model are removed. For example, from a geometrical knowledge that "all candidate vertices and candidate edges are boundaries of candidate faces," isolated points and pendant edges are removed.

(5) Construction of solid model

A set of candidate faces that can be boundaries of the solid model is searched for. Since the solid model has a limitation that "all edges are shared by only two faces, and the components do not intersect other than on boundaries," all sets that meet this condition are determined.

A problem in the construction of the solid model from the three orthographic views is the potential ambiguity of the three orthographic views. Since the three orthographic views are two-dimensional pictures, they cannot represent all of the intrinsic three-dimensional shapes. Therefore, for example, a plurality of solid models such as A, B, and C in FIGS. 9A, 9B and 9C may be generated for a set of three orthographic views shown in FIG. 8. The number of solid models generated due to the ambiguity exponentially increases. For example, when there are m ambiguities at a position and n ambiguities at another position, there are present a total of m×n ambiguities.

Heretofore, in the prior art, a plurality of solid models corresponding to three orthographic views are sequentially prepared, sequentially displayed as candidates to be selected on a solid model display screen, the final solid model is determined by a user specifying a desired candidate among the candidates on the display screen.

3. Problems to be Solved by the Invention

When different directions of placement are allowed, the stereographic models of shapes A, B, and C in FIGS. 9A, 9B and 9C have 3 cases for type A, 8 cases for type B, and 8 cases for type C, and a total of 19 solid models must be prepared, among which the desired solid model is selected. Thus, the prior method has been such problems that as the number of selected candidates to be selected increases, a long time is required for preparation of solid models, it takes a long time to find a candidate desired by the user, and conversational operation is not possible.

Furthermore, in view of operability, it is desirable that all solid models are held, and a desired candidate is selected among them, but to realize this, large amounts of data must be held, and a storage system with a large capacity becomes required.

Therefore, with a view to eliminate such prior art problems, it is an object the present invention to provide a solid model construction method and an apparatus which is able to simplify the selection processing, to reduce constructing time of the solid models and to hold relatively small in amounts of data.

SUMMARY OF THE INVENTION

In accordance with the present invention which attains the above objects, three-dimensional data of three-dimensional definite lines forming a stereographic wire frame is obtained from two-dimensional data of vertices and definite lines given in a form of three orthographic views, the individual regions formed by the plurality of the three-dimensional definite lines are divided into cells, each having faces and volumes, and the thus obtained individual cells are held as a non-manifold data structure. Then, referring to the above three orthographic views, evaluation is made as to whether or not there is a conflict in the boundary relation between the cells, and a solid model is constructed by combining the individual cells according to a combination with no conflict of the cells.

In addition to the above, the constructed solid models are displayed on a display unit, so that the operator can select or except the solid models displayed on the display unit.

Further in addition, the individual cells held as a non-manifold data structure are displayed on the display unit, allowing the operator to select or except the individual cells displayed on the display unit.

Here, the non-manifold data structure is a data structure of a super-set of the solid model, which is suitable for representing a model (cell decomposition model) in which a space is divided into a plurality of regions (cells).

Figure 10A:
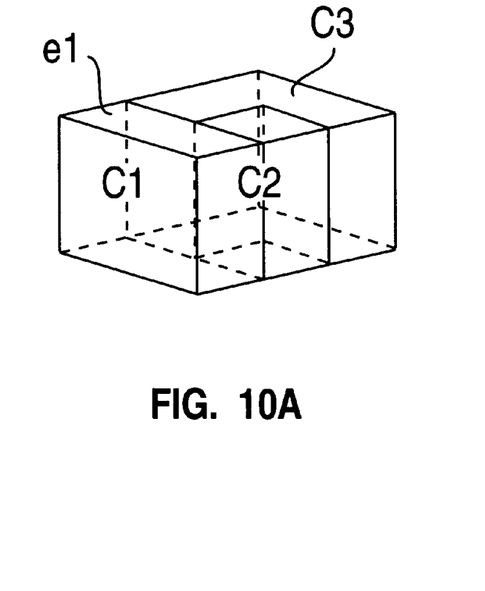
FIGS. 10A–10C are schematic perspective illustrations explaining a cell decomposition model of non-manifold data.
Figure 10B:
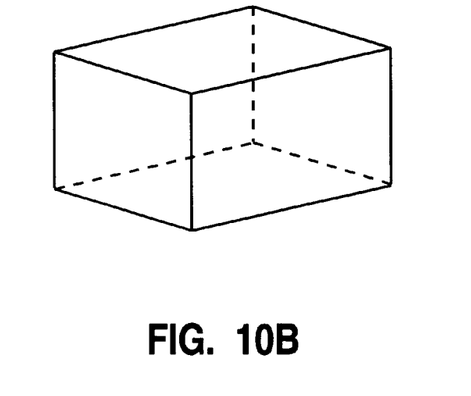
Figure 10C:
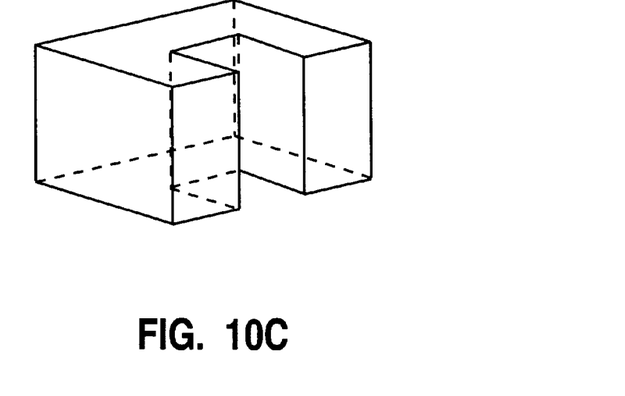

FIG. 10A shows an example of cell decomposition model in which a space is divided into three cells C1, C2, and C3. Appropriate cells can be selected from them to represent a variety of solids. In this case, when one cell is selected as part of a solid shape, that cell is called "active," and a cell which is not active is written as –C1. FIGS. 10B and 10C are individually solid shapes generated by selecting (C1, C2, C3), (C1, –C2, C3) and taking the boundaries. In general, the number of solids that can be produced by combining n cells is (2n–1) types. That is, an exponential number of solid models can be represented by one cell decomposition model. Furthermore, a shape model having a cell structure is called a non-manifold because it includes edges shared by three or more faces such as an edge e1 in FIG. 10A.

DETAILED DESCRIPTION OF THE PREFERRED EMBODIMENTS

In the present invention, a cell decomposition model of non-manifold (i.e. non-aggragated) data structures is prepared to represent a number of solid models using a single shape model. Therefore, a plurality of candidate solids appearing in the solid model construction process can be appropriately represented. Thus, a cell decomposition model is prepared which is able to represent shapes of all solid model candidates as combinations of cells. A combination of cells of the thus prepared cell decomposition model is a non-conflicting "solution" actually corresponding to the three orthographic views. Cells are combined according to the solution to construct several non-conflicting solid model candidates, which are shown to the operator for selection of the desired one.

The operator is also able to determine whether or not a specific cell is active so that the operator can limit the solution space. While meeting the limitation, the system finds a combination of cells corresponding to the orthographic views.

Preferred embodiments of the present invention will now be described in detail with reference to drawings.

Figure 1:
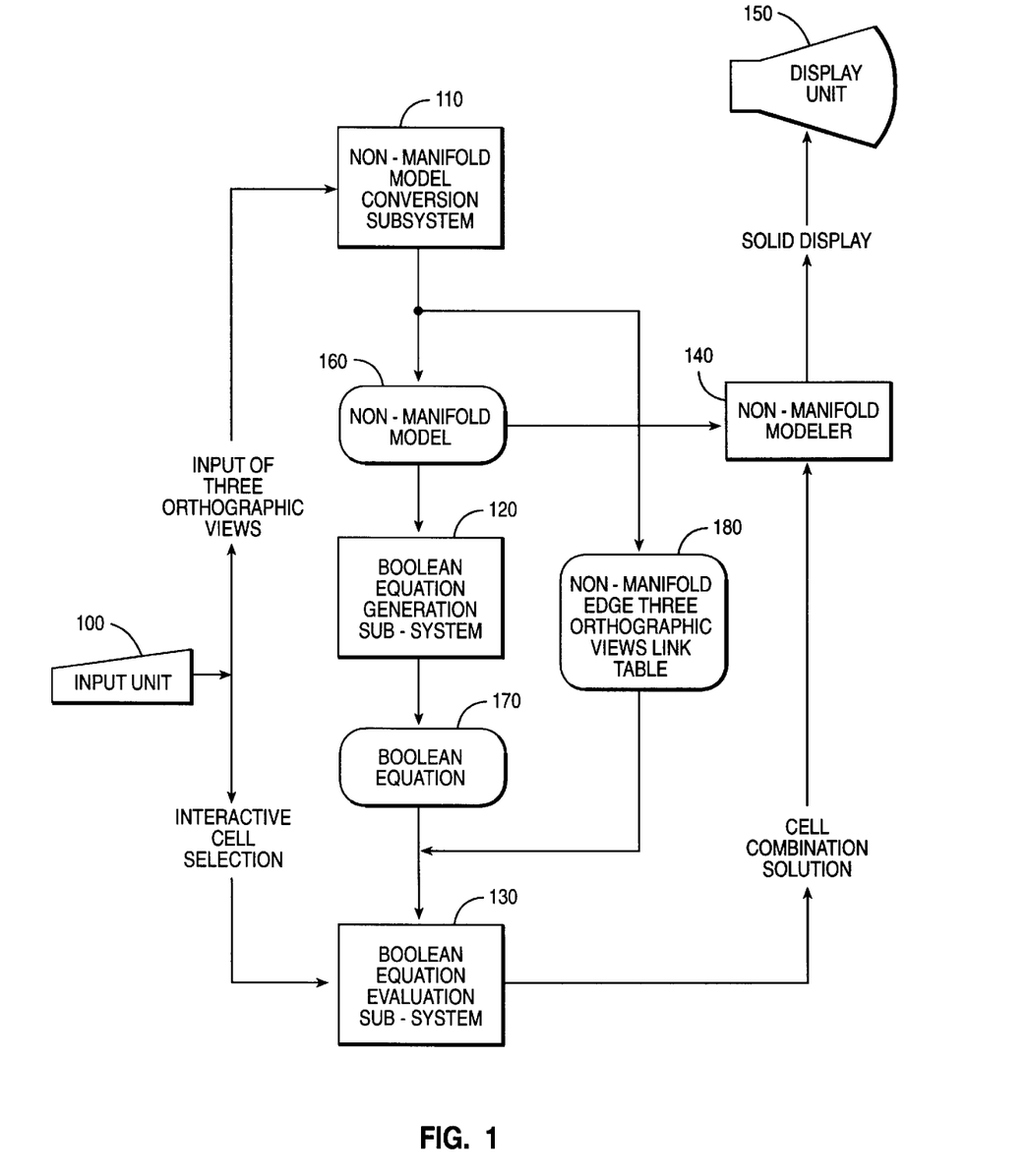
FIG. 1 is a block diagram showing a basic arrangement of the embodiment of the present invention.

FIG. 1 shows a main structure of a solid model construction apparatus in which the shape of a solid model is inputted in a form of three orthographic views to construct at least one of the solid models corresponding to the three orthographic views.

In FIG. 1, a wire frame model is considered which is obtained by developing definite lines shown by the three orthographic views in a three-dimensional space.

The main part of the solid model construction apparatus, as shown in FIG. 1, has three subsystems: a cell decomposition model conversion system 110; a Boolean equation generation system 120; and a Boolean equation evaluation system 130. The cell decomposition conversion system 110 forms a cell decomposition model according to line data obtained from a data input unit of three orthographic views 100, and holds the resulting data as non-manifold (i.e. decomposed) model (cell decomposition model) data 160. The Boolean equation generation system 120 develops a Boolean equation containing an expression that must be satisfied for a combination of cells in the cell decomposition model and individual edges of the cells to be visible, and holds the equation as Boolean equation data 170. The Boolean equation evaluation system 130 refers to a link table 180 describing correspondence (links) between edges of the non-manifold model and edges appearing on the three orthographic views to evaluate the Boolean equation data 170 while taking into account correspondence between the edges of the cell decomposition model and the three orthographic views, and then calculates a combination of cells which satisfies the equations with no conflict. This results in a cell combination solution. A non-manifold modeler 140 prepares a solid model according to the thus obtained cell combination solution, and displays it on a display unit 150.

Figure 2:
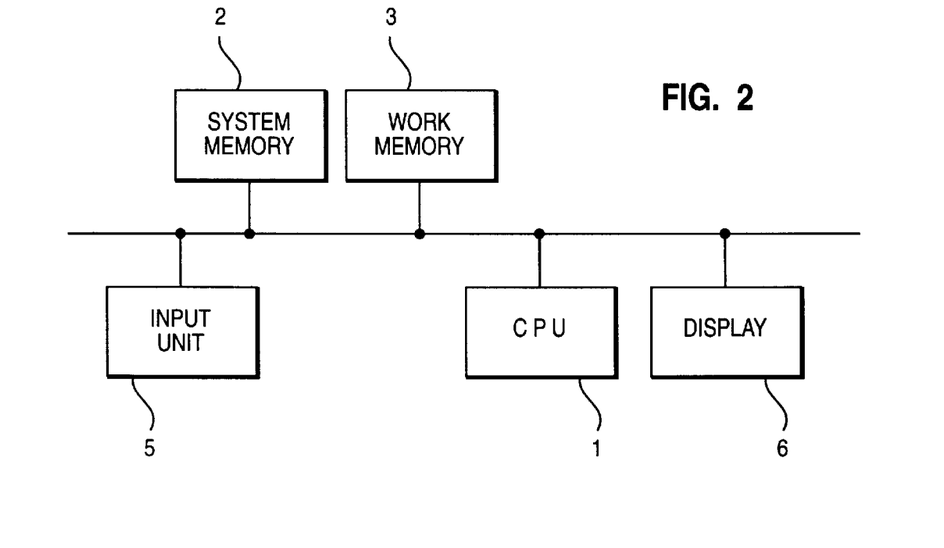
FIG. 2 is a block diagram showing a practical arrangement of the embodiment of the present invention.

FIG. 2 shows structure of main circuits of an image processing unit to which the present invention is applied.

Referring to FIG. 2, CPU 1, a system memory 2, a work memory 3, a keyboard (input unit) 5, and a display 6 are connected commonly to a bus 7. The CPU 1 executes control over the image processing related to the present invention and the entire system according to a system program stored in the system memory 2.

Figure 3:
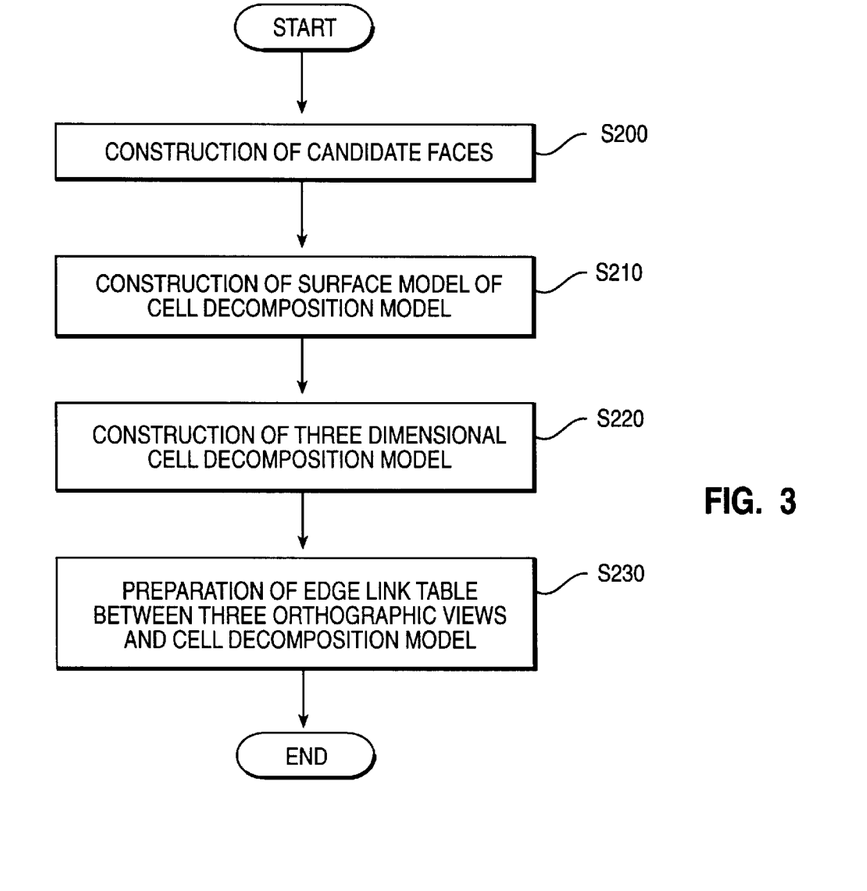
FIG. 3 is a flow chart showing a control procedure executed by CPU 1.
Figure 4:
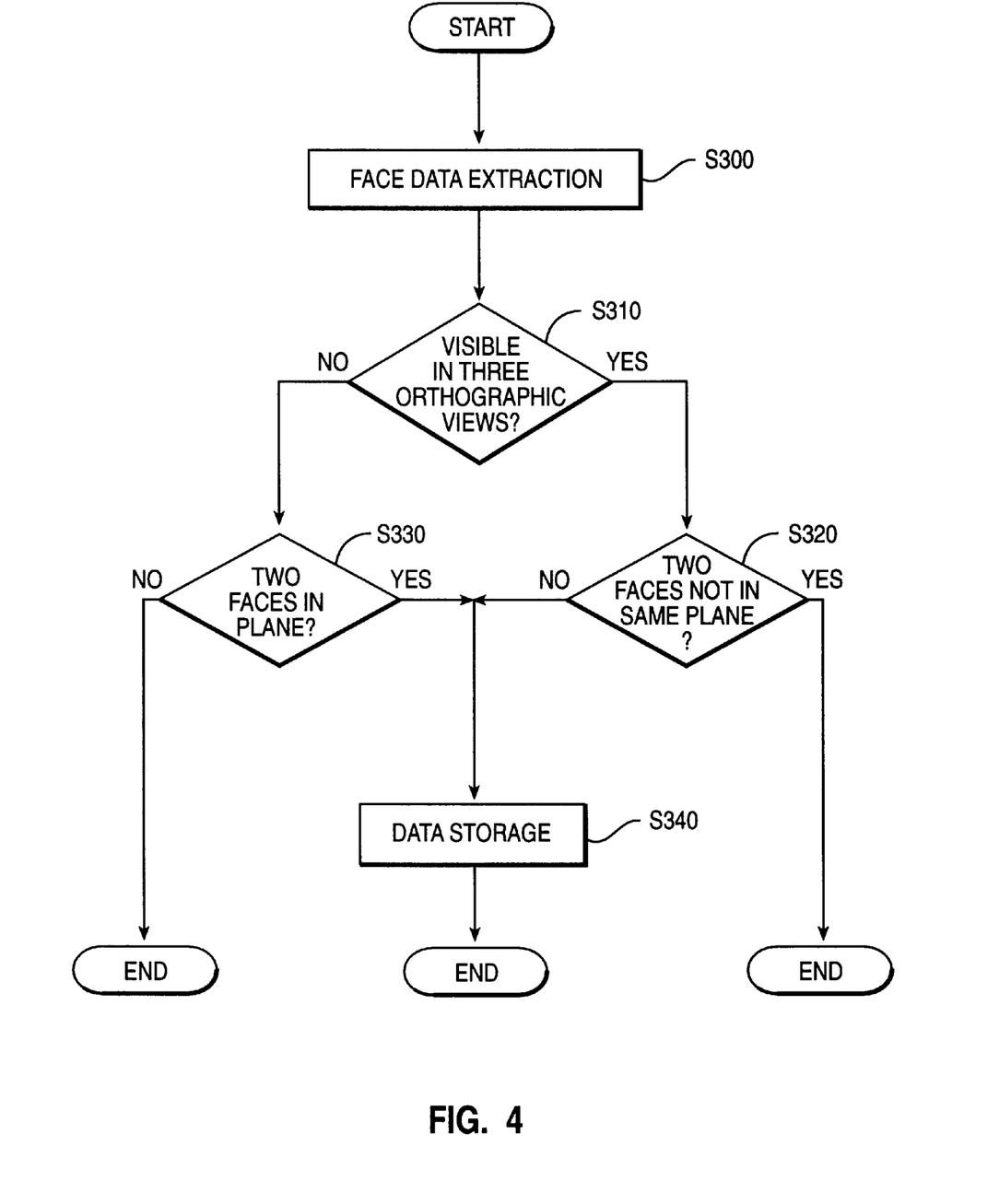
FIG. 4 is a flow chart showing a control procedure executed by CPU 1.

The system memory 2 stores a program specifying processing to be executed by the CPU 1. Processing procedure shown in FIG. 3 to FIG. 4 is also stored in the system memory 2 in a form of a program language.

The work memory 3 is used for storing various data inputted from an input unit 5 (100 in FIG. 1) comprising the keyboard, a coordinate input unit, an orthographic data storage unit, or the like, and for temporary storage of shape data and calculation data which are used for solid model construction. The coordinate input unit such as a mouse inputs a position coordinate on a display screen of the display 6 through the keyboard. The display 6 is used for displaying three orthographic views, the cell decomposition model related to the present invention, and solid models.

The solid model construction procedure executed in the image processing unit of the above arrangement will now be described.

First, a main processing procedure is described.

The operator inputs shape data of the orthographic views as shown in FIG. 8 by reading from a three-orthographic-views data storage unit or by the coordinate input unit. More specifically, two-dimensional coordinate data ((Xs, Ys), (Xe, Ye)) comprising a set of a start point coordinates and an end point coordinates of a definite line on the three orthographic views is inputted. The inputted orthographic view-related data (hereinafter referred to as orthographic view data) is stored in the work memory 3 by the CPU 1.

Figure 5:
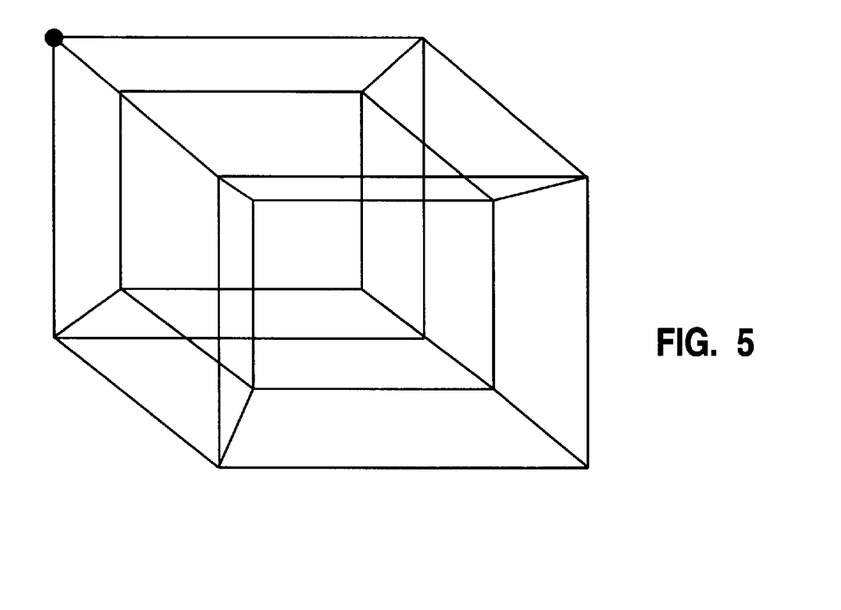
FIG. 5 is a schematic perspective illustration showing an example of a wire frame model.

The CPU 1 converts the three orthographic views data to three-dimensional coordinates showing a wire frame structure. The wire frame structure is such as the one shown in FIG. 5, and represents a three-dimensionally assembled representation of definite lines shown by the three orthographic view data in FIG. 8. Three-dimensional line data of straight lines is prepared from the three orthographic view data in FIG. 8 using a conventional method known in the prior art. The three-dimensional straight line data is a three-dimensional data comprising a set of start point coordinates and end point coordinates ((Xs, Ys, Zs), (Xe, Ye, Ze)) of a straight line. The three-dimensional straight line data is one which is intermediately prepared for generating the cell decomposition model, and is not held until end of the solid model construction processing.

Figure 6:
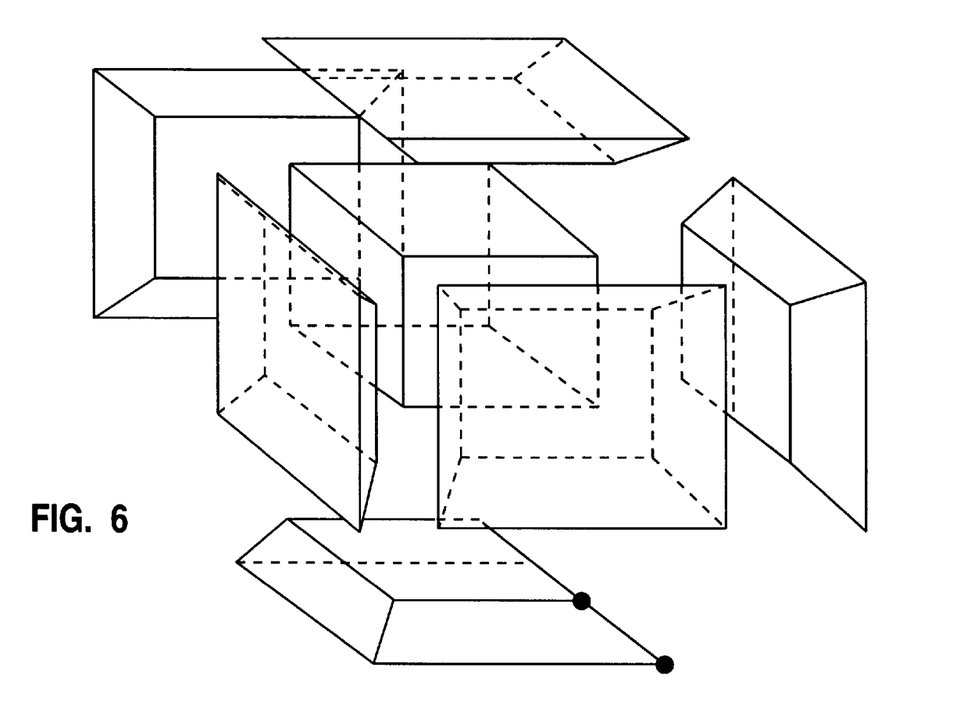
FIG. 6 is a schematic perspective illustration showing an example of a cell decomposition model.

Then, the CPU 1 prepares the cell decomposition model related to the present invention. Each cell forming the cell decomposition model is a minimum unit region delimited by definite lines forming the wire frame shown in FIG. 5, and in the example, the model is divided into seven cells as shown in FIG. 6.

Figure 7:
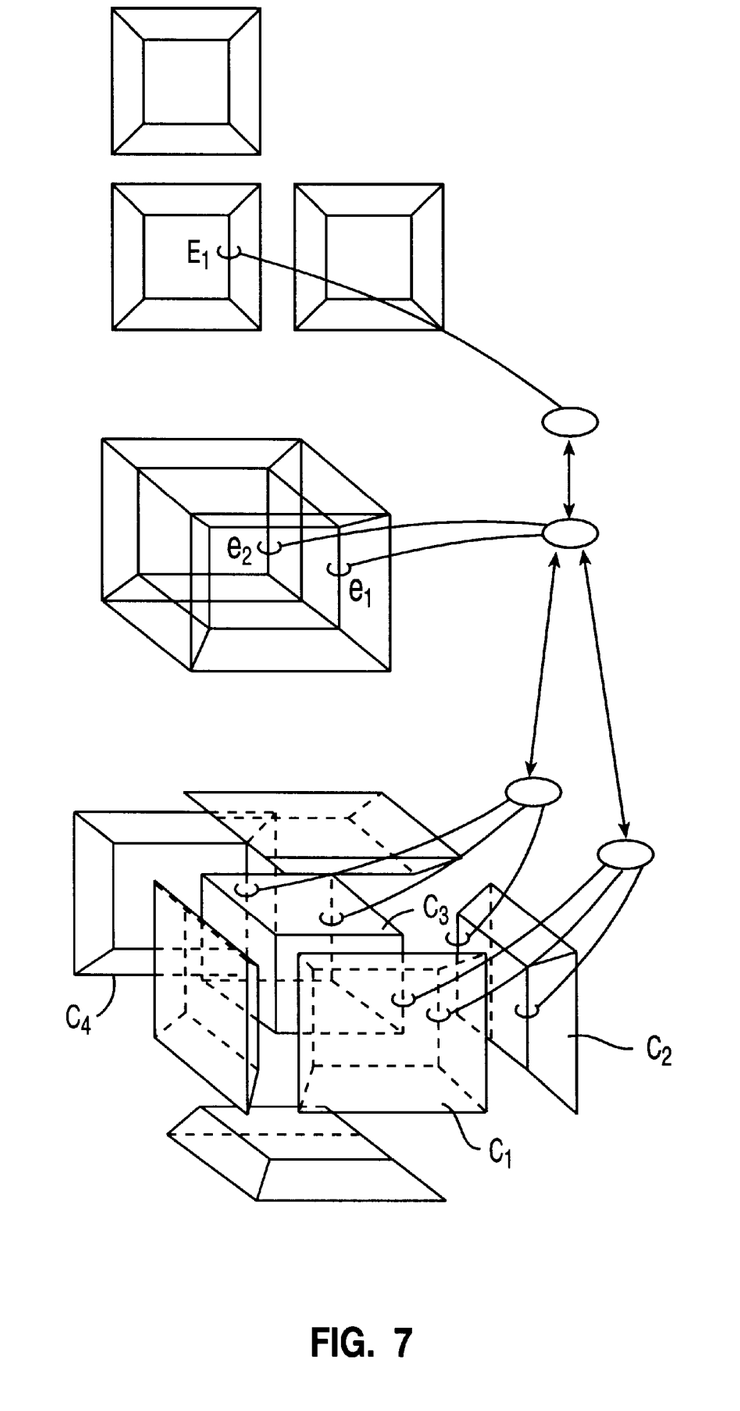
FIG. 7 is a schematic perspective illustration showing link between a wire frame model and a cell decomposition model.

The thus obtained cell decomposition model is stored as non-manifold model data 160 in the memory 3, which can be displayed on the display unit 150 through the non-manifold modeler 140 by the operator's instruction. Further, in the course of the cell decomposition model preparation, as illustrated in FIG. 7, a link between definite lines in the three orthographic views and the edges in the corresponding cell decomposition model is stored as a non-manifold (i.e. decomposed) edge orthographic edge link table 180 in the memory 3. An edge of the non-manifold model is specified by a cell number, a face number, and an edge number, and one edge in the three orthographic views links to a plurality of non-manifold edges.

Then, the CPU 1 determines an expression for the condition at which a combination of cells and the individual edges in the cell decomposition model that is visible and represents the expression by a Boolean equation, and stores the equation as Boolean equation data 170 in the memory 3.

Then, the CPU 1 refers to the link table 180 and evaluates all of the edges in the cell decomposition model represented by the Boolean equation as to whether or not they correspond to the edges on the three orthographic views, and a corresponding, that is, a non-conflicting cell combination is obtained as a solution. According to the solution, the CPU 1 prepares a solid model from non-manifold model data 160, and displays the model on the display unit 6 (numeral 150 in FIG. 1). Alternatively, the user may be allowed to adopt or not a specific cell from the input unit 5 (numeral 100 in FIG. 1), and by this means the solution can be narrowed even further reflecting the user's desire.

In general, a plurality of solutions are determined due to an ambiguity of the three orthographic views, and accordingly a plurality of solid models are prepared. However, since it is sufficient to combine cells of a non-manifold data structure according to the cell combination solutions, a number of solid model structures can be rapidly prepared compared to the slower prior art method in which candidate solid models are individually prepared from the three orthographic views.

The user can select the desired solid model from displayed solid models using the input unit 5 (numeral 100 in FIG. 1).

Next, preparation processing of the above cell decomposition model data will be described.

The data structure of the cell decomposition model is represented by a set ({Ci, {Fj}}) having a cell number allocated to the cell and a face number allocated to the face constituting the cell. Structure of the face indicated by the face number is represented by a set ({Fi, (Xp, Yp, Zp), (Xn, Yn, Zn), {Ej}}) having attribute data comprising a coordinate of a point on the face and normal line vector, and an edge number constituting that face. Furthermore, the attribute data is held for individual edges ({Ei, (Xs, Ys, Zs), {Xe, Ye, Ze}}).

The detailed construction procedure (refer to FIG. 3) of the cell decomposition model shown by such data group is as follows.

(1) From the given three orthographic views data, all candidate faces that possibly form solid model faces are calculated. The edge of the candidate face has a link with only one edge or vertex on each of the corresponding projection faces of the three orthographic views (S200 in FIG. 3).

(2) All of the candidate faces are summed up by set calculation to prepare a surface model of the cell decomposition model (S210 in FIG. 3). Edges of the faces of the prepared cell decomposition model include the following two types.
  (i) An edge which has a link with an edge or vertex of the three orthographic views.
  (ii) Intersecting edges between candidate faces.
(3) From the prepared surface model of the cell decomposition model, three-dimensional shells are determined to prepare a three-dimensional cell structure. The three-dimensional cell is calculated by the following technique (S220 in FIG. 3). The calculated cell is named as C1, C2, . . . .
  (i) All faces include front faces and back faces, which are related to the front side or the back side of other faces individually adjacent to each other through boundary edges of faces.
  (ii) All faces linked to each other are searched for. These faces are boundaries of three-dimensional shells.
  (iii) The calculated three-dimensional shells include those which represent inside of the three-dimensional shell and those which represent outside of the three-dimensional shell. These can be distinguished by the following processing.
    (a) A boundary face {Fi} (i=1, . . . , n) is taken out.
    (b) An area Ai of Fi is calculated.
    (c) A distance Di between a face on which Fi is present and the origin point is determined.
    (d) A normal line Ni of Fi is determined to face the outside of the three-dimensional cell.
      Further, a sign i of the inner product of Ni with a position vector Pi of a given point on Fi is determined.
    (e) The three-dimensional shell represents inside of the shell when a value Vol (C) (volume of three-dimensional cell) determined by the following equation is positive, and it is outside of the shell when Vol (C) is negative.

$$\mathrm{Vol}(C) = \sum_{i=0}^{n} (\sigma i * Ai * Di/3) \qquad (1)$$

(iv) Since, in the three-dimensional shells which are determined to have negative Vol, one which has the greatest absolute value of Vol is the outermost cell having an infinite volume, it is omitted. Furthermore, since each of others which has negative Vol, represents a cavity, a shell having positive Vol containing the shell inside is determined, and these are registered as a single three-dimensional cell. Other shells having positive Vol are determined as three-dimensional cells having no cavity.

Since, using the cell decomposition model prepared by the above processing, a number of solids which are the same in shape on the three orthographic views can be represented as a single shape model, the amount of data to be held can be considerably reduced compared to those which holding data for every solid model, and it is convenient to represent a plurality of candidate solids appearing in the solid construction process. In the present embodiment, the combination condition of cells in the cell decomposition model under which individual edges included in the cell are visible is represented by a Boolean equation. The Boolean equation is evaluated while linking the edges of the cell decomposition model with the three orthographic views, and a cell combination which satisfies the condition is calculated. Finally, a solid model is constructed from the thus obtained cell combination. For this purpose, a link table showing a link between edges of the cell decomposition model and the three orthographic views is prepared on the work memory 3 by CPU 1 (S230 in FIG. 3). Link between the edges of the cell decomposition model, the three orthographic views, and the wire frame model is shown in FIG. 7.

Based on the link table, the detailed procedure (FIG. 4) of the processing for selecting a solid model including cells selected by the user will be described.

In the present embodiment, the state at which a cell combining each of all edges on the generated cell decomposition model is visible is represented by a Boolean equation. The procedure is as follows:

(1) The presence of each cell in the cell decomposition model is defined as (P1, P2, . . . , Pn).

(2) For all edges (E1, E2, . . . , Ek) of the cell decomposition model, the state under which the model appears as solid edges is determined as follows:

(i) First, cells sharing the edge are listed, and their presence is indicated as (P1, P2, . . . Pk). In this case, the number of cell combinations is k'th power of 2.

(ii) In faces around the edge, two faces included in a same plane are selected (S300 in FIG. 4), and a cell combination is generated which makes all cells on one of the half planes including one of the two faces active, and all cells on the other half plane void. Two combinations are generated depending on which of the half planes is made active.

(iii) When two faces included in the same plane are not present (YES in S320, NO in S330 of FIG. 4), a combination in which all cells around the edge are active, and a combination in which all are void are generated.

(iv) From the set of the entire combinations of (i), combinations of (ii) and (iii) are subtracted (corresponding to S340 in FIG. 4).

For example, with an eye on edge e1 of the wire frame model in FIG. 7, in order that the edge e1 is present in the cell decomposition model in FIG. 7, the first condition is that the edge e1 links to the edge E1 in the three orthographic views. Furthermore, a second condition is that two of cells C1, C2, and C3 having the edge e1 in FIG. 7 must intersect (not on the same plane), or, a cell which has the edge e1 is the only one.

This is represented by a Boolean equation.

$$e1 \to E1$$

$$e2 \to E2$$

$$C1 \times C2 \times \overline{C3} \to e1 \text{ or,}$$

$$C1 \times \overline{C2} \times C3 \to e1 \text{ or,}$$

$$\overline{C1} \times C2 \times C3 \to e1 \text{ or,}$$

$$C1 \times \overline{C2} \times \overline{C3} \to e1 \text{ or,}$$

$$\overline{C1} \times C2 \times \overline{C3} \to e1 \text{ or,}$$

$$\overline{C1} \times \overline{C2} \times C3 \to e1.$$

Here, the multiplication symbol (X) indicates AND (logical multiplication), and the bar symbol indicates that the cell number with the bar symbol is not present.

Such Boolean equations are set up for all of the edges, and these equations are solved to obtain non-conflicting cell combinations for the pattern shown in the three orthographic views. That is, the presence of each cell is assumed, and a Boolean equation is given as a justification equation to evaluate and calculate a non-conflicting combination of the assumptions (interpretation).

When the three orthographic views inherently involve an ambiguity, a plurality of non-conflicting cell combinations are obtained.

According to the above-obtained non-conflicting cell combination, the individual cells in the cell decomposition model are selected or excepted to be assembled for constructing several solid models corresponding to the three orthographic views.

These solid model candidates are displayed on the display unit, and the desired one is selected by the user's instruction from the input unit. In this stage, since solid models conflicting with the orthographic views are omitted by a series of processing, selection work can be readily performed.

Since, in the present embodiment, whether or not a cell in the cell decomposition model is needed, that is, due to a combination of cells, a partial structure or the entire structure of the solid model, can also be specified by the user, only cells which are not specified by the user are selection candidates. In other words, by extracting cell combinations having a partial combination specified by the user from all cell combinations, solid model candidates corresponding to the three orthographic views are narrowed.

In the above-described example in FIG. 8, there are six cell combinations of three cells in which one edge e1 is represented on the three orthographic views. When the user specifies cell C1, for example, to be "need," there are the following three combinations of need or not of cells:

C1—need, C2—need, C3—No;

C1—need, C2—No, C3—need;

C1—need, C2—No, C3—No.

When the user specifies need or not of two cells C1 and C2, one or two combination solutions are obtained on need or not of cells which satisfy the Boolean equation. Furthermore, when need or not of three cells C1, C2, and C3 is specified, needless to say, the solution of the Boolean equation is one.

In the above embodiment a model comprising straight lines and planar faces is used as an example, however, the present invention can also be applied to models including curved edges and non-planar surfaces (i.e., cylinder, cone, sphere, and torus). In this case, a start point coordinate, an end point coordinate, and equation of the curved edges are inputted as three orthographic view data, and corresponding cells having surfaces are handled.

As described above, with the present invention, a simplification of the user's work on the solid model construction, a reduction in time required for the solid model construction, and a reduction in amounts of data required for the solid model construction can be achieved.

We claim:

1. A solid model construction method in which a shape of a solid model is inputted in the form of three orthographic views to an image processing unit for constructing a solid model from said orthographic views, comprising:

obtaining three-dimensional data of three-dimensional definite lines forming a stereographic wire frame corresponding to patterns from two-dimensional data of vertices and definite lines of said patterns given as said three orthographic views;

dividing individual regions formed by the plurality of three-dimensional definite lines into cells having faces and volumes;

holding the divided cells as a non-manifold data structure;

testing said three orthographic views to evaluate whether or not there is a conflict in the boundary relation between said cells; and a step for constructing a solid model by combining said individual cells according to a combination with no conflict of said cells.

2. A solid model construction apparatus for constructing a solid model by inputting a shape of the solid model in the form of three orthographic views to construct the solid model corresponding to said three orthographic views, comprising:

means for obtaining three-dimensional data of three-dimensional definite lines forming a stereographic wire frame corresponding to patterns from two-dimensional data of vertices and definite lines of said pattern given as said three orthographic views;

means for dividing individual regions formed by the plurality of three-dimensional lines into cells having faces and volumes;

means for holding the divided cells as a non-manifold data structure;

means for referring to said three orthographic views to evaluate whether or not there is a conflict in the boundary relation between said cells; and means for constructing a solid model by combining said individual cells according to a combination with no conflict of said cells.

3. A solid model construction apparatus as claimed in claim 2, further comprising means for displaying the constructed solid model on a display unit; and input means for causing an operator to select or except each of the solid models displayed on said display unit.

4. A solid model construction apparatus as claimed in claim 3, further comprising means for displaying said individual cells held as the non-manifold structure on a display unit; and input means for causing an operator to select or except said individual cells displayed on said display unit; wherein said means for evaluating whether there is a conflict in the boundary relation between said cells makes evaluation according to the selection of said cells.

5. A solid model construction apparatus as claimed in claim 4 further comprising means for inputting the two-dimensional data of the stereographic vertices and the definite lines in the form of the three orthographic views.

* * * * *